May 19, 1925.
H. S. MORRISON
TOASTING MACHINE
Filed Jan. 29, 1924
1,538,864
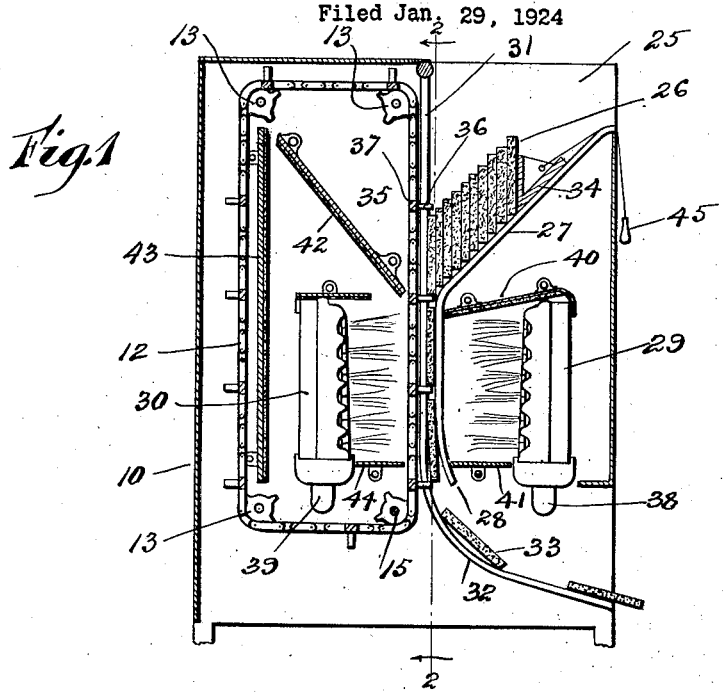
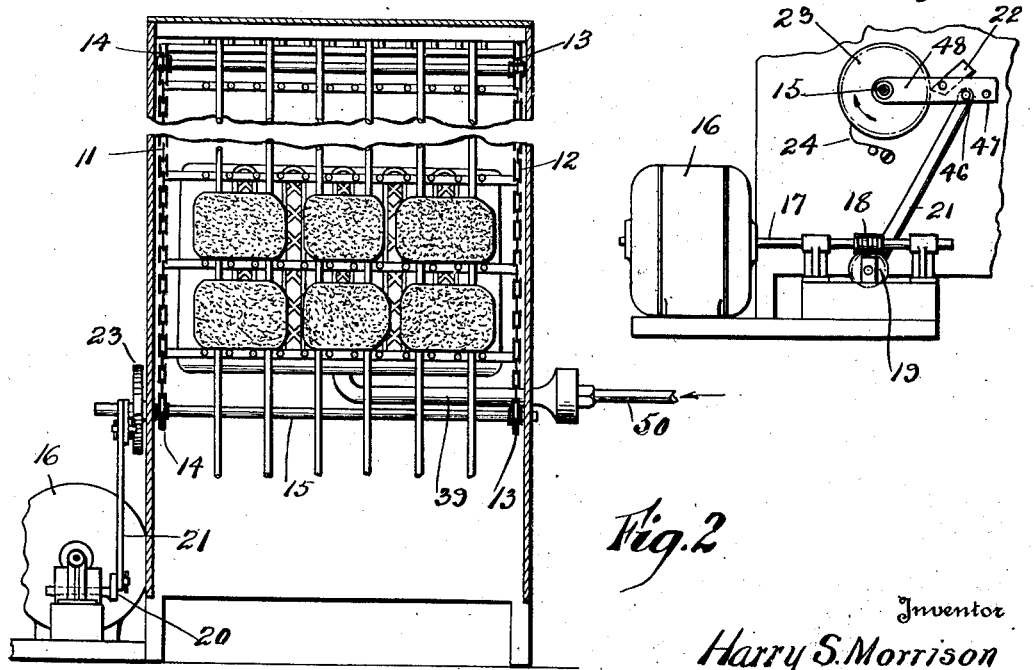
Inventor
Harry S. Morrison
By Barlow & Barlow
Attorney Patented May 19, 1925.

1,538,864

UNITED STATES PATENT OFFICE.

HARRY S. MORRISON, OF AUBURN, RHODE ISLAND.

TOASTING MACHINE.

Application filed January 29, 1924. Serial No. 689,332.

*To all whom it may concern:*

Be it known that I, HARRY S. MORRISON, a citizen of the United States, residing at Auburn, in the county of Providence and State of Rhode Island, have invented certain new and useful Improvements in Toasting Machines, of which the following is a specification.

This invention relates to machines adapted primarily for toasting slices of bread, but which may be employed for broiling meats and similar treatments foods in which it is desired to subject such foods directly to a toasting or roasting heat on both of its sides simultaneously; and the object of this invention is to provide such a device or machine with a pair of spaced-apart heating elements and means for automatically passing the food to be treated between the heating elements at a predetermined speed to be finally discharged after having been so acted upon.

With these and other objects in view, the invention consists of certain novel features of construction, as will be more fully described, and particularly pointed out in the appended claims.

In the accompanying drawings:

Figure 1 is a central sectional side elevation illustrating a plurality of slices of bread held in a magazine and fed successively through the machine, the toast being subjected on both sides to heating elements.

Figure 2 is a front view of my improved toasting machine sectioned on line 2—2 of Figure 1, showing a plurality of slices of bread 26 as being fed through the machine.

Figure 3 is a side elevation illustrating the intermittent or step-by-step pawl and ratchet feeding mechanism.

It is found in the practical operation of bread-toasting machines of this character, of advantage to provide a casing having a magazine in which a quantity of slices of bread or other food, is deposited to be fed successively through the machine to be acted upon on opposite sides by heating elements to toast or treat the same, means being provided for feeding the slices automatically. It is also found of advantage to provide means in the machine whereby the bread while being toasted is exposed to the action of air to carry away the moisture or steam emanating from the bread during the action of heat upon it, whereby the slices of bread are thoroughly toasted throughout their thickness which is not the case where bread is held inclosed while being toasted; and the following is a detailed description of one construction by which these advantageous results may be accomplished:—

With reference to the drawings, 10 designates the casing inclosing the operating mechanism of the toaster, which may be formed of any suitable material that shown being sheet metal to render the same light in weight and a complete unit which is readily portable.

In this casing, I have mounted a pair of spaced-apart carrier sprocket chains 11 and 12 located on either side of the casing, one sprocket chain being conducted over the four sprocket wheels 13 while the other chain 12 is conducted over similar sprockets 14 on the opposite side of the machine, all being driven through the two lower sprockets and mounted on shaft 15 from the motor 16 through shaft 17, worm 18, worm gear 19, crank 20, connector 21, pawl 22, and ratchet wheel 23 which latter is mounted on the shaft 15, the ratchet wheel 23 being prevented from a backward motion during the reciprocating action of the driving mechanism by means of the spring pawl 24, the mechanism imparting a step-by-step feed to the food being passed through the machine during its treatment by the heat from the heating elements hereinafter described.

A magazine 25 is formed in the upper portion of the casing for the reception of a plurality of rows of slices of bread 26 set end to end and the slices in each row setting face to face, the floor of the magazine comprising a set of spaced apart wires 27 set on an incline to facilitate the feeding of the bread, as illustrated in Figure 1, the lower ends of the wires being arranged to extend down to a point 28 past the heating units 29 and 30. These wires are arranged to cooperate with another set of spaced-apart feed wires 34 which extend from the uper portion of the casing down past the heating elements and are spaced back from the front wires 27 a distance substantially that of the thickness of a slice of bread. These rear wires are curved outwardly as at 32 to serve as a discharge chute for the slices 33 when toasted.

In order to assist in the feed of the slices of bread forwardly or down the inclined surface of the wires 27 into position to be engaged by the carrier chains, I have provided a weighted slide plate 34 which is arranged to engage the last slices of each row and press the whole forward, the front slices 35 lying against the upright guide wires 31 in position to be engaged by the fingers 36 which extend through these wires 31 from the cross bars 37 on the carrier chains 11 and 12, one set of fingers being arranged to engage the upper edges of the slices to advance them while the next previous set of fingers serve as a rest for the bottom of the slices to prevent them from dropping too freely through the machine, both sets of feed fingers being arranged to control the speed of feeding the slices successively along between the heating elements to be acted upon and toasted thereby.

These heating elements may in some instances, be raised to a high degree of heat by the burning of gas therein, which fuel is conducted to these elements through gas supply pipes 38 and 39 which may be connected to any suitable source of supply through pipe 50 and the heat from these heating elements is caused to act upon both sides of these slices of bread simultaneously as they are moved past them to properly dry, brown and toast the same, all of which toasting actions take place in a chamber suitably supplied with air.

In order to provide sufficient air space for absorbing the moisture from the bread as the heat is applied to it, I have provided an outer wall 40 beneath the inclined surface of the magazine, which wall also serves to prevent the direct heat from acting upon the slices in the magazine. I have also provided a lower wall 41 to further confine the heat from this element 29 and assist in directing it against the bread.

The walls 42, 43 and 44 are arranged about the other heating element 30 to confine in a measure the heat from this element and prevent it from excessively heating the carrier chains and permitting them to cool when in non-operating position.

These metal walls 40, 41, 42, 43 and 44 inclusive may all be lined with asbestos, if desired, to prevent excess radiation of heat from the chamber they inclose.

It will be noticed that in this construction of machine the toast is permitted to be acted upon by heating elements in an air space, which air is permitted to be freely circulated about the bread while being toasted, to accomplish which the inner edges of the walls 40—42; 41—44 are sufficiently far apart to permit a draft of air passing upward therethrough and out through the open top of the machine.

After the last slice 26 in the magazine has been engaged by the feeding fingers 36 to be fed down through the toasting zone, the operator engages a handle 45 and withdraws the bar 34 to engage the lowermost slice of a fresh batch of slices positioned in the magazine to be fed through the machine.

My improved toasting device is very simple and practical in construction and effective in its operation and by its use a multiplicity of slices may be toasted simultaneously and fed in successively from the top of the machine and discharged from the bottom of the same into a suitable receptacle (not shown).

In some instances the feeding speed of the apparatus may be adjusted by simply moving the pivot point 46 out to the hole 47 which will slow down the feed of the carrier chain, and as many of such adjustments as desired may be obtained by providing similar pivot holes in the arm 48.

I have shown and described the heating elements 29 and 30 as being heated by burning gas therein but electrical heating elements may be employed instead of those shown, if desired.

My improved toasting machine is very simple and practical in construction and effective in its operation and by its use I may be enabled to have a plurality of slices of toast acted upon by the heating elements both sides being toasted at once and discharged finally through the bottom of the machine, but I do not wish to be restricted to the feeding of slices of bread through the machine as any other food such as meat and the like may be fed through the machine if desired to be acted upon by the heating elements as fed past the same.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a portable toasting device, a pair of heating elements, a carrier for passing a slice of bread vertically between said elements at a predetermined speed whereby it is toasted on both sides, and means for engaging and positively withdrawing the toasted slices from said carrier.

2. A toaster comprising a casing having a magazine for supporting and feeding a plurality of slices of bread in a substantially vertical plane to a carrier, a pair of spaced-apart heating elements below the magazine, a vertically movable carrier for receiving the slices from said magazine conducting them downwardly between and discharging them below said heating elements, and means for automatically driving said carrier at a predetermined speed.

3. A toaster comprising a casing, a pair of spaced-apart heating elements in said casing, means for feeding slices of bread between said elements to toast the same on both sides simultaneously, an air passageway in the casing for permitting the circulation of air through the casing about the slices while subjected to the toasting heat, and guides for engaging and positively withdrawing the slices from the feeding means.

4. In a toasting device, a pair of heating elements, spaced apart sets of vertically-arranged guide wires between said heaters, a magazine for holding a supply of slices of bread, gravity-actuated means for feeding said slices to said guide wires, and carrier means for controlling the passage of said slices between said sets of guide wires past said heating elements.

5. In a toasting device, a pair of heating elements, spaced-apart sets of vertically-arranged guide wires between said heaters, a magazine for holding a supply of slices of bread, gravity-actuated means for feeding said slices to said guide wires, and carrier means for controlling the passage of said slices between said sets of guide wires past said heating elements, said guide wires being arranged to positively withdraw the slices from said carrier after having been subjected to the toasting heat.

6. In a toasting device, a pair of vertically arranged spaced apart heating elements, two sets of spaced apart guide wires located between said elements, and a carrier having fingers extending through one set of guide wires to engage and conduct the slices of bread downwardly between said sets of guide wires to expose the opposite sides of the slice to said elements to toast the same.

7. A toaster comprising a casing having a magazine for supporting a plurality of slices of bread side by side in contiguous relation, a pair of spaced-apart heating elements, two sets of spaced apart guide wires between which the slices are fed, a pair of spaced-apart sprocket chains connected at intervals by feed bars, and fingers on said bars projecting between said guide wires to engage the foremost of the slices at the magazine and feed them between said heating elements to be toasted on both sides simultaneously.

8. In a toasting device, a pair of vertically arranged spaced-apart heating elements, two sets of spaced-apart guide wires located between said elements, one of said sets of guide wires being disposed to form a discharge chute, the other of said sets being disposed to form a support for the slices of bread before toasting and a carrier for conveying the slices from said support between said heating elements to said discharge chute whereby the slices are toasted on both sides.

In testimony whereof I affix my signature.

HARRY S. MORRISON.